United States Patent
Kanee et al.

(10) Patent No.: US 8,433,911 B2
(45) Date of Patent: Apr. 30, 2013

(54) MANAGEMENT SERVER, MANAGEMENT METHOD, MANAGEMENT SYSTEM FOR DOWNLOADING OF CONTENTS, AND MOBILE DEVICES

(75) Inventors: Kazuhiro Kanee, Chiba (JP); Muneki Shimada, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 390 days.

(21) Appl. No.: 12/819,398

(22) Filed: Jun. 21, 2010

(65) Prior Publication Data

US 2011/0093715 A1  Apr. 21, 2011

(30) Foreign Application Priority Data

Sep. 29, 2009  (JP) .................................. 2009-224684

(51) Int. Cl.
*H04L 9/00* (2006.01)
(52) U.S. Cl.
USPC .......................................................... 713/176
(58) Field of Classification Search .................... 713/176
See application file for complete search history.

(56) References Cited

U.S. PATENT DOCUMENTS

| 7,941,128 | B2 | 5/2011 | Ueno et al. | |
|---|---|---|---|---|
| 2009/0081998 | A1 | 3/2009 | Ueno | |
| 2009/0150487 | A1* | 6/2009 | Wolfish et al. | 709/203 |
| 2009/0183010 | A1* | 7/2009 | Schnell et al. | 713/193 |
| 2011/0055933 | A1* | 3/2011 | Ishiguro | 726/27 |

FOREIGN PATENT DOCUMENTS

| EP | 1881439 A1 | 1/2008 |
|---|---|---|
| JP | 2000242604 A | 9/2000 |
| JP | 2001175605 A | 6/2001 |
| JP | 2003218782 A | 7/2003 |
| JP | 2005286598 A | 10/2005 |
| JP | 2005328399 A | 11/2005 |
| JP | 2006-526341 A | 11/2006 |
| WO | 2004107284 A1 | 12/2004 |

OTHER PUBLICATIONS

Japanese Office Action for corresponding Japanese Application No. 2009-224684, dated Oct. 18, 2011.
European Search report for corresponding European Application No. 10162194.4, dated Oct. 21, 2011.
Japanese Office Action for corresponding Japanese Application No. 2009-224684, dated Aug. 30, 2011.

* cited by examiner

*Primary Examiner* — Matthew Smithers
(74) *Attorney, Agent, or Firm* — Matthew B. Dernier, Esq.; Gibson & Dernier LLP (57) ABSTRACT

A receiver is configured to receive, from a mobile device of a first type adapted to read a content from a recording medium and run the content, a first device identifier identifying the mobile device of the first type and a recording medium identifier identifying a recording medium loaded in the mobile device of the first type, along with a digital signature generated in the mobile device of the first type using an encryption key secretly stored in the mobile device of the first type. A signature verification unit is configured to verify the authenticity of the digital signature. A voucher issuance unit is configured to issue a voucher to a mobile device of a second type adapted to acquire a content by downloading the content and to run the content accordingly and mapped into the mobile device of the first type, so that the mobile device of the second type is capable of downloading a content.

10 Claims, 7 Drawing Sheets

| 54 | 56 | 58 NO. OF DEVICES POSSESSED | 60 DEVICE IDENTIFIER | | | |
|---|---|---|---|---|---|---|
| USER ID A | RECORDING MEDIUM TYPE | 3 | A-1-1 | A-1-2 | A-1-3 | ... |
| | DOWNLOADING TYPE | 1 | A-2-1 | | | |
| USER ID B | RECORDING MEDIUM TYPE | 1 | B-1-1 | | | |
| | DOWNLOADING TYPE | 1 | B-2-1 | | | |
| ... | | ... | ... | ... | ... | ... |
| USER ID X | RECORDING MEDIUM TYPE | 1 | X-1-1 | | | |
| | DOWNLOADING TYPE | 2 | X-2-1 | X-2-2 | | ... |
| ... | | | | | | |

MANAGEMENT SERVER, MANAGEMENT METHOD, MANAGEMENT SYSTEM FOR DOWNLOADING OF CONTENTS, AND MOBILE DEVICES

BACKGROUND OF THE INVENTION

1. Field of the Invention

The present invention relates to a system of managing the downloading of contents.

2. Description of the Related Art

Conventionally, player devices capable of playing back contents such as photos and moving images acquire contents from a recording medium. As broadband network access has become available easily in recent years, methods have been used to download and acquire contents over a network. The trend is also seen in mobile devices that utilize wireless technologies. Some mobile devices used are no longer provided with a mechanism to acquire contents from a recording medium.

Mobile devices of the first type adapted to read contents from a recording medium and run the contents thus read (hereinafter, referred to as "recording medium type devices"), and mobile devices of the second type adapted to acquire contents by downloading the contents over a network (hereinafter, referred to as "downloading type devices") and to run the contents thus acquired are both available for use. However, it has become difficult to exchange contents between devices of different types because the two types differ in the medium used to distribute contents.

SUMMARY OF THE INVENTION

The present invention addressees the drawback and a purpose thereof is to provide a technology capable of managing the exchange of contents safely.

One embodiment of the present invention addressing the above-mentioned drawback relates to a server adapted to manage contents. The content management server comprises: a receiver configured to receive, from a mobile device of a first type adapted to read a content from a recording medium and run the content, a first device identifier identifying the mobile device of the first type and a recording medium identifier identifying a recording medium loaded in the mobile device of the first type, along with a digital signature generated in the mobile device of the first type using an encryption key secretly stored in the mobile device of the first type; a signature verification unit configured to verify that the recording medium is loaded in the mobile device of the first type by verifying the authenticity of the digital signature; a storage unit configured to store a table that maps the first recording medium identifier into a second device identifier identifying a mobile device of a second type adapted to acquire a content by downloading the content and to run the content accordingly; and a voucher issuance unit configured to issue, when it is confirmed that the recording medium is loaded in the mobile device of the first type, a voucher to the mobile device of the second type determined as being mapped into the mobile device of the first type by referring to the table, so that the mobile device of the second type is capable of downloading a content.

Another embodiment of the present invention addressing the above-mentioned drawback relates to a mobile device of a type adapted to read a content from a recording medium and run the content accordingly. The mobile device comprises: a recording medium identifier acquisition unit configured to acquire, from a recording medium configured to be loaded into a mobile device of a type adapted to read a content from a recording medium and run the content, a recording medium identifier identifying the recording medium; a storage unit configured to store a device identifier identifying the mobile device and an encryption key for encrypting a signature; a digital signature application unit configured to generate a digital signature for the recording medium identifier and the device identifier based on the signature encryption key, and apply the digital signature to the recording medium identifier and the device identifier; and a transmitter configured to transmit the recording medium identifier and the device identifier with the digital signature to the server.

Still another embodiment of the present invention addressing the above-mentioned drawback relates to a mobile device of a type adapted to acquire a content by downloading the content. The mobile device comprises: a receiver configured to receive a voucher that allows downloading of a content and that is issued when it is verified that a recording medium storing a content is inserted into a mobile device of a type adapted to read a content from a recording medium and run the content, as a result of verifying the authenticity of a digital signature generated by using a device identifier identifying the mobile device and a recording medium identifier identifying the recording medium; a presentation unit configured to present the voucher to a server from which to download the content; and a content acquisition unit configured to acquire the content by downloading the content from the server.

Still another embodiment of the present invention addressing the above-mentioned drawback relates to a content management system. The content management system comprises; a mobile device of a first type adapted to read a content from a recording medium and run the content; a mobile device of a second type adapted to acquire a content by downloading the content and to run the content accordingly; and a server accessible from the mobile device of the first type and the mobile device of the second type. The mobile device of the first type comprises: a recording medium identifier acquisition unit configured to acquire a recording medium identifier identifying a recording medium inserted into the mobile device of the first type; a storage unit configured to store a first device identifier identifying the mobile device of the first type; a digital signature application unit configured to generate a digital signature from the recording medium identifier acquired from the recording medium identifier acquisition unit and the first device identifier acquired from the storage unit, using a signature encryption key stored in a secret area in the storage unit, and to apply the digital signature to the recording medium identifier and the first device identifier; and a transmitter configured to transmit the recording medium identifier and the first device identifier with the digital signature to the server. The server comprises: a receiver configured to receive, from the transmitter of the mobile device of the first type, the recording medium identifier and the first device identifier with the digital signature; a signature verification unit configured to verify the authenticity of the digital signature; and a voucher issuance unit configured to issue, when the digital signature is verified by the signature verification unit as being authentic, a voucher that allows the mobile device of the second type to download a content. The mobile device of the second type comprises: a receiver configured to receive the voucher from the voucher issuance unit; a presentation unit configured to present the voucher to the server from which to download the content; and a content acquisition unit configured to acquire the content by downloading the content.

Still another embodiment of the present invention addressing the above-mentioned drawback relates to a content management method. The content management method comprises: receiving, from a mobile device of a first type adapted to read a content from a recording medium and run the content, a first device identifier identifying the mobile device of the first type and a recording medium identifier identifying a recording medium loaded in the mobile device of the first type, along with a digital signature generated in the mobile device of the first type using an encryption key secretly stored in the mobile device of the first type; verifying that the recording medium is loaded in the mobile device of the first type by verifying the authenticity of the digital signature; reading a table that maps the first recording medium identifier into a second device identifier identifying a mobile device of a second type adapted to acquire a content by downloading the content and to run the content accordingly, and storing the table in a memory; and allowing, when it is confirmed that the recording medium is loaded in the mobile device of the first type, the mobile device of the second type determined as being mapped into the mobile device of the first type by referring to the table stored in the memory, to download a content.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 shows an exemplary data structure of a database in which the first device identifier identifying the recording medium type device possessed by a given user and the second device identifier identifying the downloading type device possessed by the same user are mapped into each other.

DETAILED DESCRIPTION OF THE INVENTION

The invention will now be described by reference to the preferred embodiments. This does not intend to limit the scope of the present invention, but to exemplify the invention.

A summary will be give before describing the content management system according to the embodiment of the present invention.

A user in possession of both a recording medium type device and a downloading type device may have a content purchased in the past in the form of a recording medium but cannot run the content on the downloading type device. To address this, when the system according to the embodiment acknowledges that a user is in possession of both a recording medium type device and a recording medium that can be loaded and read in the device, the system ensures that the downloading type device possessed by the user can download a selected content over a network. The selected content may not necessarily be the content recorded in the recording medium possessed by the user.

Figure 1:
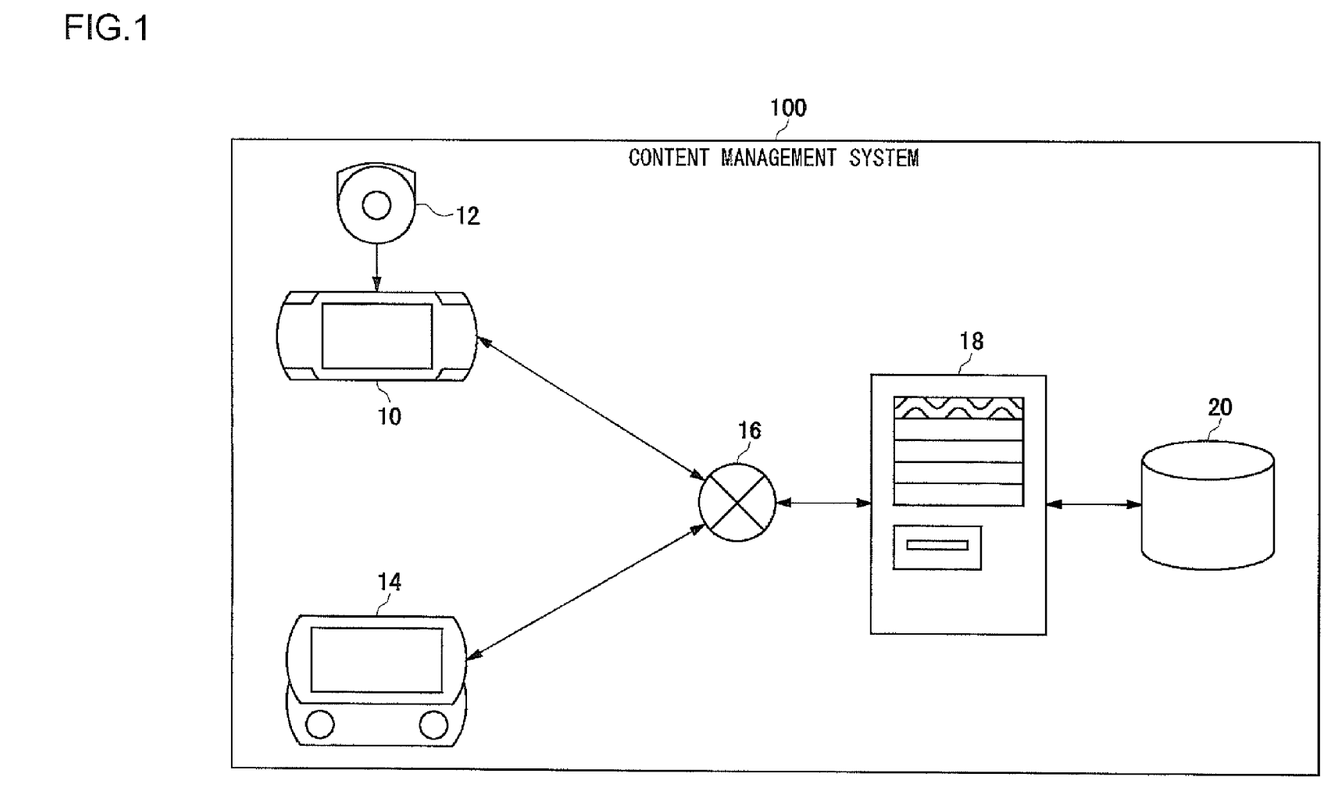
FIG. 1 shows a schematic configuration of a content management system according to the embodiment.

FIG. 1 shows a schematic configuration of a content management system 100 according to the embodiment. The content management system 100 includes a recording medium type device 10, a recording medium 12, a downloading type device 14, a network 16, a server 18, and a database 20. The content management system 100 is a client server system in which a large number of recording medium type devices 10 and downloading type devices 14 are connected to a server 18. The description below highlights the recording medium type device 10 and the downloading type device 14 possessed by one particular user, assuming that these devices access the server 18.

When a recording medium 12 is inserted into a slot (not shown) of the recording medium type device 10, the recording medium type device 10 applies a digital signature to a recording medium identifier identifying the recording medium 12 and to the first device identifier identifying the recording medium type device 10. The server 18 receives the identifiers with the digital signature over the network 16 such as the Internet. The server 18 verifies the authenticity of the digital signature thus received. When the digital signature is verified to be authentic, the server 18 refers to the database 20 and examines whether the user in possession of the recording medium type device 10 is also in possession of a downloading type device. The database 20 stores a table in which the first device identifier identifying the recording medium type device 10 is mapped into the second device identifier identifying the downloading type device 14 possessed by the same user. The detail will be described later.

When it is verified that the user in possession of the recording medium type device 10 is also in possession of the downloading type device 14, the server 18 ensures that the downloading type device 14 can download a content stored in the database 20. More specifically, when the downloading type device 14 accesses the server 18 over the network 16, the server verifies the second device identifier identifying the downloading type device 14 and ensures that the downloading type device 14 can access a content stored in the database 20. The downloading type device 14 acquires the content by accessing a server that allows downloading of the content and by downloading the content accordingly.

Figure 2:
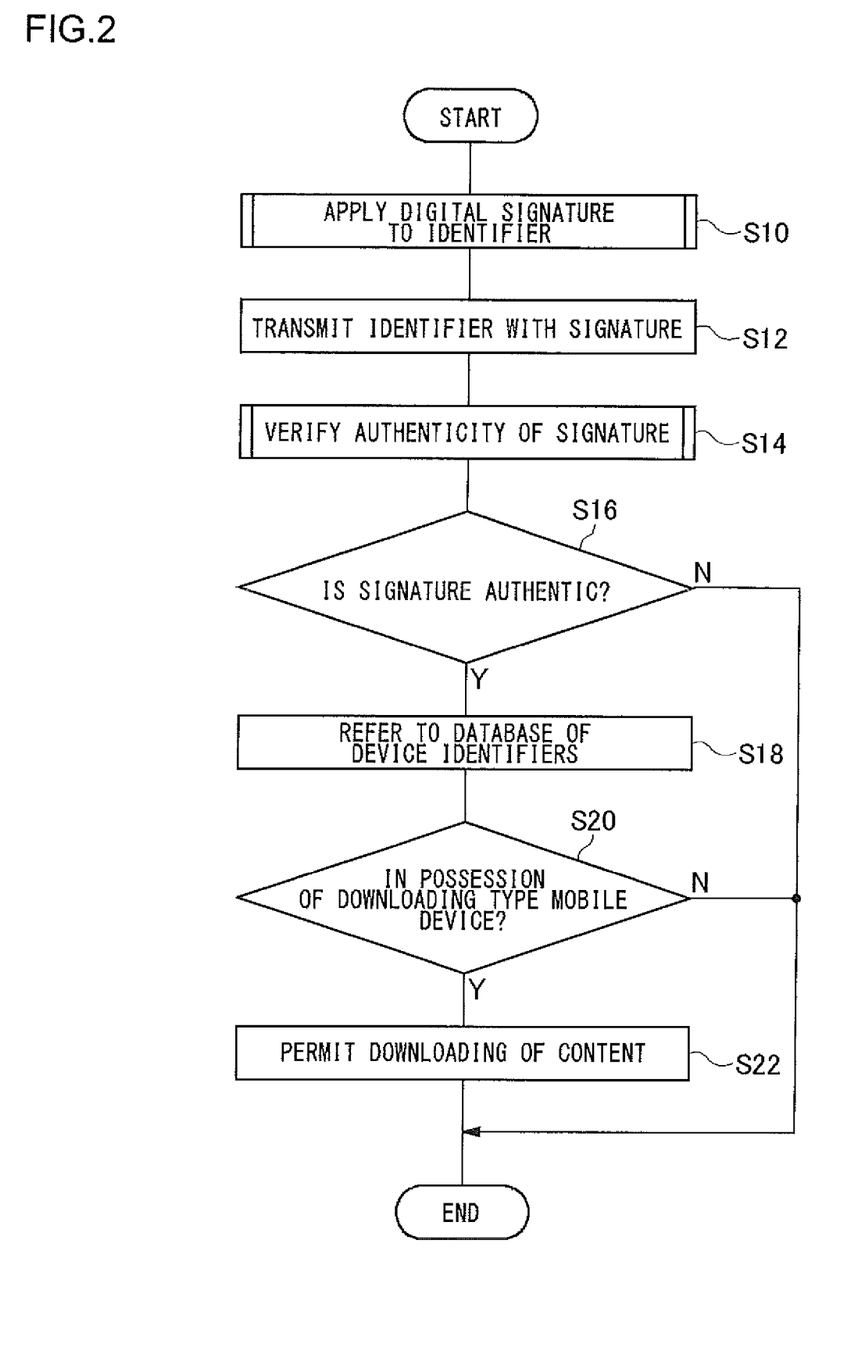
FIG. 2 is a flowchart showing the steps performed since a recording medium is into the recording medium type device of FIG. 1 until a content is ready for downloading.

FIG. 2 is a flowchart showing the steps performed since the recording medium 12 is into the recording medium type device 10 of FIG. 1 until the content is ready for downloading. The process of the flowchart is initiated when the recording medium 12 is inserted into the recording medium type device 10.

The recording medium type device 10 applies a digital signature to the recording medium identifier identifying the recording medium 12 and to the first device identifier identifying the recording medium type device 10 (S10). The server 18 receives the identifiers with the digital signature over the network 16 such as the Internet (S12). The server 18 verifies the authenticity of the digital signature thus received (S14). When the digital signature is verified to be authentic (Y of S16), the server 18 refers to the database 20 and examines whether the user in possession of the recording medium type device 10 is also in possession of the downloading type device 14 (S18).

When it is verified that the user in possession of the recording medium type device 10 is also in possession of the downloading type device 14 (Y of S20), the server permits the downloading type device 14 to access a content stored in the database 20 (S22) and terminates the process. When the digital signature is not verified to be authentic (N of S16), or when it cannot be verified that the user in possession of the recording medium type device 10 is also in possession of the downloading type device 14 (N of S20), the server 18 does nothing and terminates the process.

Figure 3:
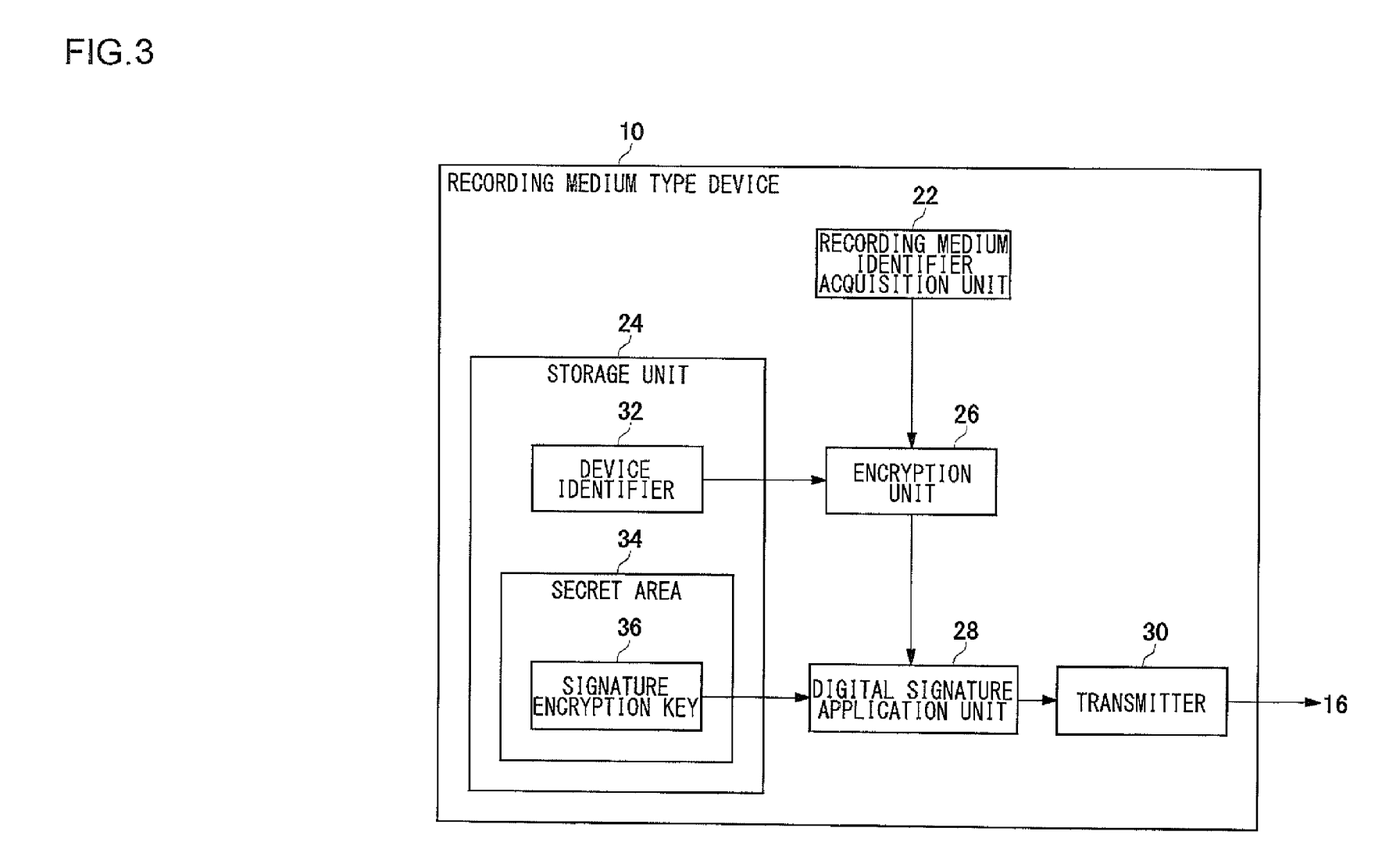
FIG. 3 is a block diagram schematically representing the function, provided in the recording medium type device of FIG. 1, of applying a digital signature to the recording medium identifier identifying the recording medium and to the first device identifier identifying the recording medium type device.

FIG. 3 is a block diagram schematically representing the function, provided in the recording medium type device 10, of applying a digital signature to the recording medium identifier identifying the recording medium 12 and to the first device identifier identifying the recording medium type device 10. The recording medium type device 10 includes a recording medium identifier acquisition unit 22, a storage unit 24, an encryption unit 26, a digital signature application unit 28, and a transmission unit 30.

The recording medium identifier acquisition unit 22 acquires the recording medium identifier stored in the recording medium 12 inserted into the recording medium type device 10 and uniquely identifying the recording medium. The recording medium identifier is a serial number uniquely assigned to the recording medium 12 that can be read by recording medium type devices 10 that are generally available. By way of another example, the recording medium identifier is a set comprising a content identifier identifying the content stored in the recording medium 12 (e.g., game A) and serial numbers assigned to all recording mediums 12 storing game A. The former case involves only one recording medium identifier and is advantageous in that it is easy to manage the identifier. The latter case does not require that the serial number forming the identifier be increased even if the number of types of contents is increased and so is advantageous in that the identifier is managed using a smaller number of digits.

The storage unit 24 includes a device identifier 32 and a signature encryption key 36. The signature encryption key 36 is stored in a secret area 34 included in the storage unit 24. Information stored in the secret area 34 cannot be accessed from outside the recording medium type device 10.

The encryption unit 26 combines the recording medium identifier acquired from the recording medium identifier acquisition unit 22 and the first device identifier 32 identifying the recording medium type device 10 and acquired from the storage unit 24, and encrypts the identifiers thus combined using a key shared with the server 18. The digital signature application unit 28 first acquires from the encryption unit 26 an encrypted text in which the recording medium identifier and the first device identifier 32 are encrypted. The unit 28 uses the signature encryption key 36 stored in the secret area 34 to generate a digital signature for the encrypted identifiers. The unit 28 then applies the digital signature to the encrypted identifiers and generates an encrypted text with the digital signature. The transmitter 30 acquires the encrypted text with the digital signature from the digital signature application unit 28 and transmits the encrypted text with the digital signature to the server 18 over the network 16. The digital signature is examined by the server 18 to verify that the recording medium 12 is certainly inserted into the recording medium type device 10.

Digital signature in this case is implemented by generating a hash message digest using a known hash function such as secure hash algorithm-2 (SHA-2) from the encrypted text acquired from the encryption unit 26 and derived from encrypting the recording medium identifier and the first device identifier 32, and by encrypting the message digest using the signature encryption key 36.

The signature encryption key 36 is generated from the first device identifier 32 capable of uniquely identifying the recording medium type device 10, using a predetermined algorithm. The signature encryption key 36 is generated when there is a relatively small risk that the key is leaked outside (e.g., when the recording medium type device 10 is manufactured) and is stored in the secret area 34. The server 18 stores an algorithm for generating the signature encryption key 36 but the risk that the information stored in the server 18 is leaked outside is relatively small. Therefore, there is no need to store an algorithm for generating the signature encryption key 36 in the recording medium type device 10 so that the risk that the signature encryption key 36 is leaked outside is reduced.

Figure 4:
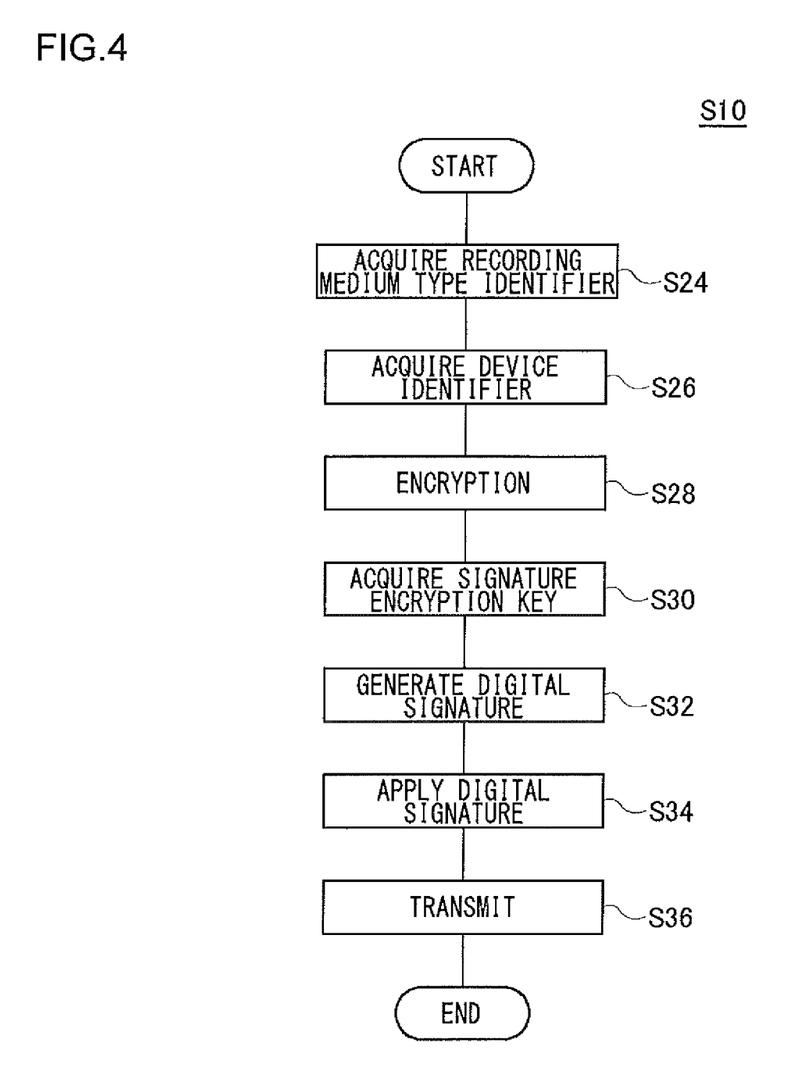
FIG. 4 is a flowchart showing the steps performed since the recording medium identifier acquisition unit of FIG. 3 acquires the recording medium identifier until the transmitter transmits the encrypted text with the digital signature.

FIG. 4 is a flowchart showing the steps performed since the recording medium identifier acquisition unit 22 of FIG. 3 acquires the recording medium identifier until the transmitter 30 transmits the encrypted text with the digital signature. FIG. 3 shows step S10 of FIG. 2 in detail.

The recording medium identifier acquisition unit 22 acquires the recording identifier identifying the recording medium 12 inserted into the recording medium type device 10 (S24). The encryption unit 26 acquires the first device identifier 32 identifying the recording medium type device 10 from the storage unit 24 (S26), combines the identifier 32 with the recording medium identifier acquired from the recording medium identifier acquisition unit 22, and encrypts the identifiers using a key shared with the server 18 (S28). The digital signature application unit 28 acquires the signature encryption key 36 stored in the secret area 34 (S30) and generates a digital signature for an encrypted text acquired from the encryption unit 26 and comprising the recording medium identifier and the first device identifier 32 as encrypted (S32). The digital signature application unit 28 applies a digital signature to the encrypted text in which the recording medium identifier and the first device identifier 32 are encrypted (S34). The transmitter acquires the encrypted text with the digital signature from the digital signature application unit 28 and transmits the encrypted text with the digital signature to the server 18 over the network 16 (S36).

Figure 5:
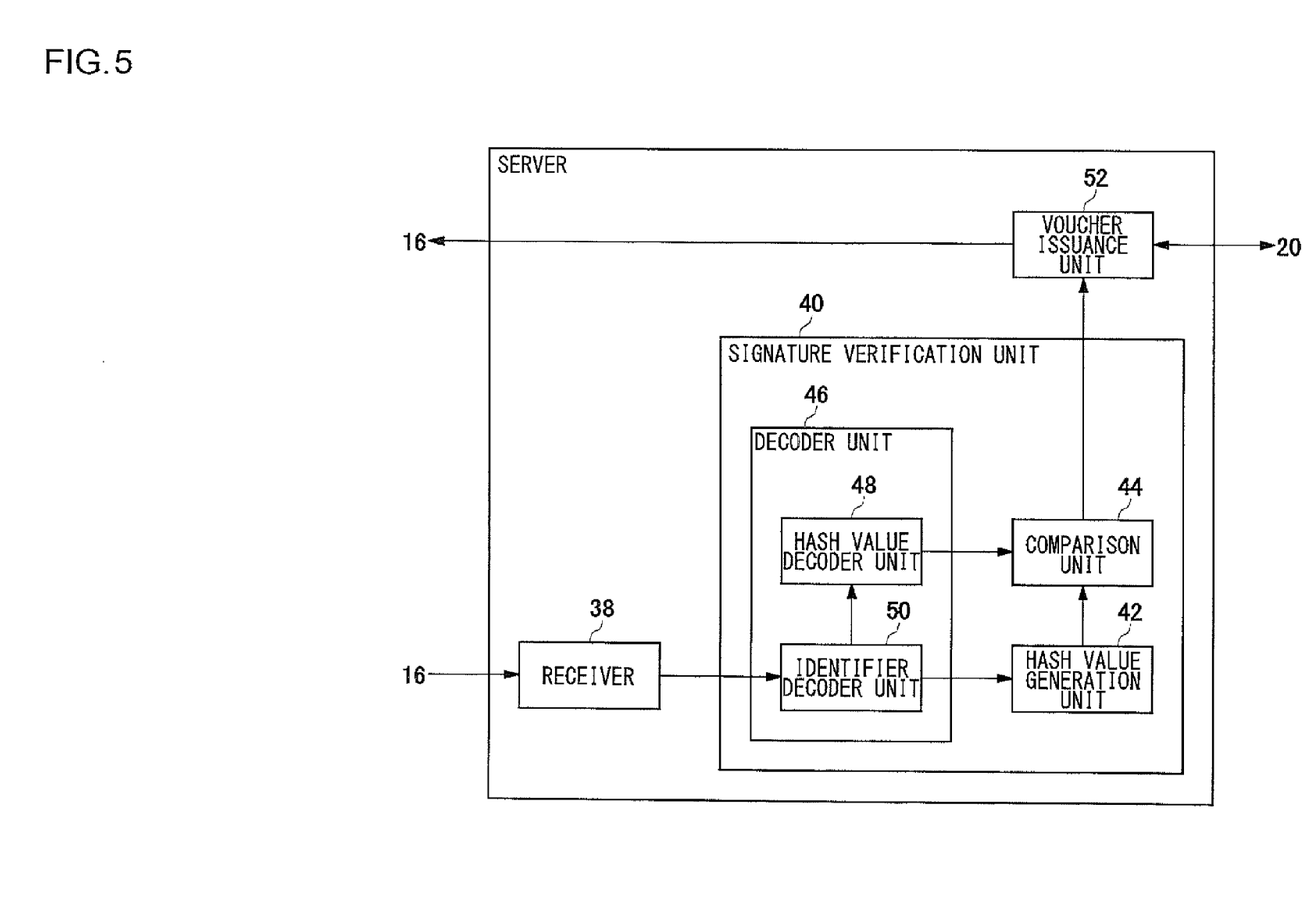
FIG. 5 is a block diagram schematically showing the function, included in the server of FIG. 1, of verifying the authenticity of a digital signature using an encrypted text with the digital signature received from the recording medium type device.

FIG. 5 is a block diagram schematically showing the function, included in the server 18, of verifying the authenticity of the digital signature using the encrypted text with the digital signature received from the recording medium type device 10. The server 18 includes a signature verification unit 40 and a voucher issuance unit 52. The signature verification unit 40 further includes a decoder 46, a hash value generation unit 42, and a comparison unit 44.

The receiver 38 receives an encrypted text with a digital signature from the recording medium type device 10 over the network 16. The decoder 46 further includes a hash value decoder 48 and an identifier decoder 50. The identifier decoder 50 retrieves the recording medium identifier and the first device identifier 32 by decoding the encrypted text with the digital signature acquired from the receiver 38. The hash value decoder 48 acquires the first device identifier from the identifier decoder 50 and generates the signature encryption key 36 using the algorithm for generating the signature encryption key 36. The unit 48 then uses the signature encryption key 36 thus generated to decode the digital signature so as to reproduce the hash value generated in the recording medium type device 10.

The hash value generation unit 42 generates a hash value using the same hash function as used in the recording medium type device 10, based on the recording medium identifier and the first device identifier acquired from the identifier decoder 50. The comparison unit 44 compares the digital signature generated by the hash value generation unit 42 and the has value retrieved by decoding in the hash value decoder 48. The unit 44 verifies the authenticity of the digital signature by examining whether they match. The voucher issuance unit 52 will be described later.

Figure 6:
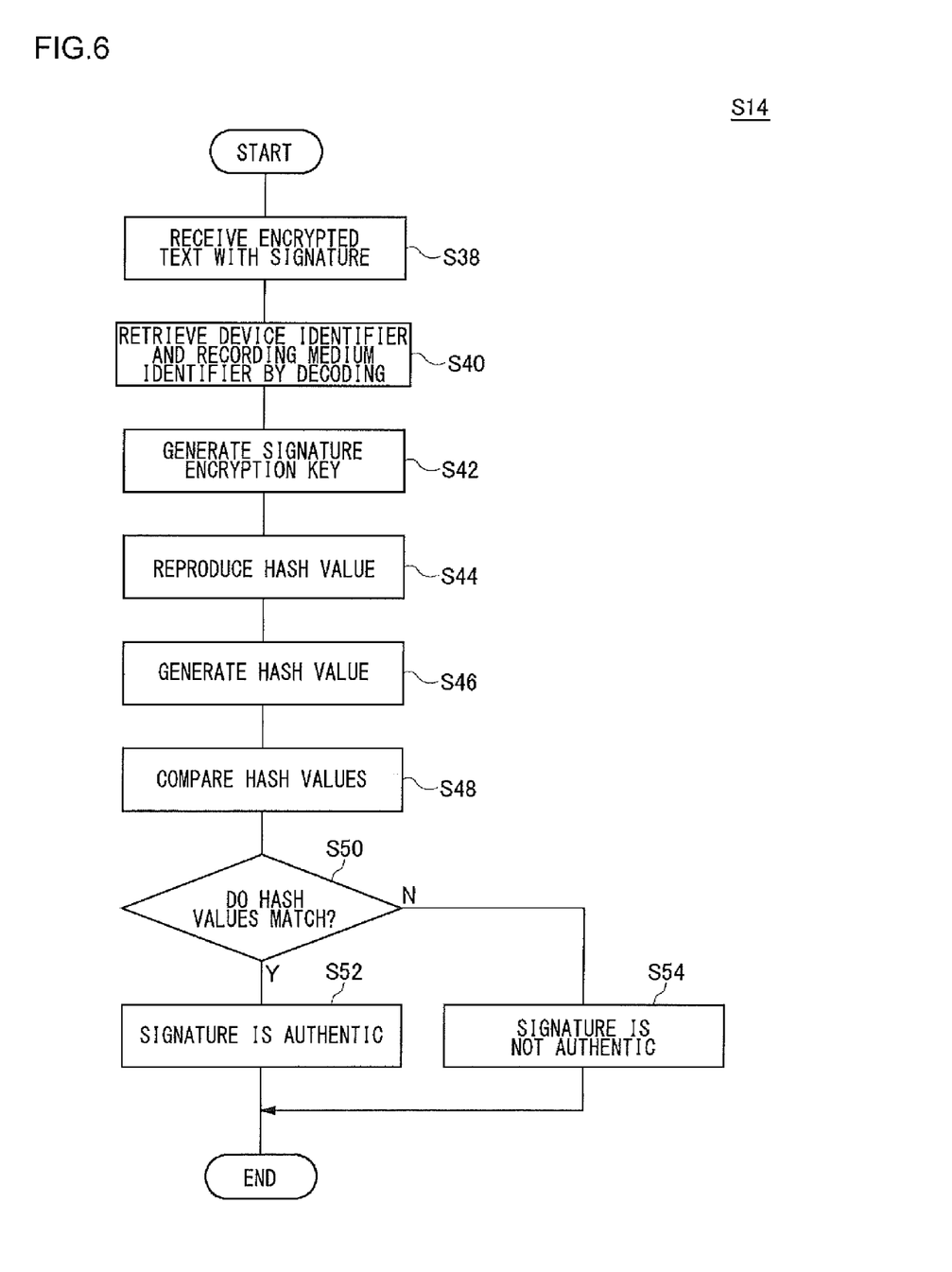
FIG. 6 is a flowchart showing the steps performed since the receiver included in the server of FIG. 1 receives an encrypted text with a digital signature from the recording medium type device over the network until the authenticity of the digital signature is verified.

FIG. 6 is a flowchart showing the steps performed since the receiver 38 receives an encrypted text with a digital signature from the recording medium type device 10 over the network 16 until the authenticity of the digital signature is verified. FIG. 6 shows step S14 of FIG. 2 in detail.

The receiver 38 receives an encrypted text with a digital signature from the recording medium type device 10 over the network 16 (S38). The identifier decoder 50 retrieves the recording medium identifier and the first device identifier 32 by decoding the encrypted text with the digital signature acquired from the receiver 38 (S40). The hash value decoding unit 48 acquires the first device identifier from the identifier decoding unit 50 and generates the signature encryption key 36 using the algorithm for generating the signature encryption key 36 (S42). The hash value decoding unit 48 then uses the signature encryption key 36 thus generated to decode the digital signature so as to reproduce the has value generated in the recording medium type device 10 (S44). The hash value generation unit 42 generates a hash value using the same hash function as used in the recording medium type device 10, based on the recording medium identifier and the first device identifier acquired from the identifier decoder 50 (S46).

The comparison unit 44 compares the digital signature generated by the hash value generation unit 42 and the has value retrieved by decoding in the hash value decoder 48 (S48). When they match (Y of S50), the comparison unit 44 determines that the digital signature received from the recording medium type device 10 over the network 16 is authentic (S52). When they do not match (N of S50), the comparison unit 44 determines that the digital signature received is not authentic (S54). When the comparison unit 44 verifies the authenticity of the digital signature, the process shown in the flowchart is terminated.

FIG. 7 shows an exemplary data structure of a database in which the first device identifier identifying the recording medium type device 10 possessed by a given user and the second device identifier identifying the downloading type device possessed by the same user are mapped into each other.

The table in the database mapping the first device identifier into the second device identifier includes a field 54 storing a user ID, a field 56 storing the number of mobile devices possessed, and a field 60 storing the device identifier. The field 58 storing the number of mobile devices possessed and the field 60 storing the device identifier are partitioned by the field 56 for identification of the types of mobile devices.

FIG. 7 shows that the user with the user ID "A" is in possession of three recording medium type devices and one downloading type device. An user ID is an identifier that uniquely identifies a user. For example, a user ID may be a user name of the account established for access from the user to the server 18. When the user in possession of the recording medium type device 10 purchases a downloading type device 14, the user accesses the server 18 and registers the number of devices that the user possesses. This can be achieved by, for example, using the mobile devices that the user possesses to access the server 18 using the same account. The server 18 may acquire the user name and the identifiers of the mobile devices and may update the information in the database each time the user accesses the server 18 using a new mobile device.

The operation of the system having the above configuration is as follows. First, the user creates an account for the server 18 and creates a database in the database 20 via the server 18 such that the database thus created contains identifiers of all of the recording medium type devices 10 and the downloading type devices 14 that the user possesses. Subsequently, the user inserts the recording medium 12 that the user possesses into one of the recording medium type devices 10 and accesses the server 18. This allows the server 18 to verify that the recording medium 12 is loaded in the recording medium type device 10 so that the server 18 permits the downloading type device 14 to access a content stored in the database 20.

Permission of access is implemented by, for example, allowing the voucher issuance unit 52 in the server 18 to issue and send, when it is confirmed that the downloading type device 14 that the user possesses accesses the server 18, a voucher to the accessing device 14 in the form of digital data, i.e. a token that allows downloading a selected content stored in the database 20. By receiving the voucher in the receiver of the downloading type device 14 and entering the voucher at, for example, an online store site built on the network, via a voucher presentation unit in the downloading type device 14, the downloading type device 14 can acquire the content by downloading the content. The online store built on the network may be implemented on the server 18. Alternatively, a dedicated server may be prepared.

Prior to the issuance of the voucher to the downloading type device 14, the voucher issuance unit 52 displays a window (not shown) in which a plurality of contents are presented to the user. This allows the user to select a desired content. The user may select the same content as stored in the recording medium 12. Alternatively, the user may select a content that the user does not possess.

The database 20 stores recording medium identifiers that the recording medium type device 10 currently available on the market is capable of reading. When the authenticity of the digital signature is verified by the comparison unit 44, a recording medium identifier verification unit (not shown) of the server 18 assigns information to the recording medium identifier with the digital signature thus verified to indicate that the verification is completed. In this way, the voucher issuance unit 52 is prevented from issuing a voucher when a given recording medium 12 is inserted into a different recording medium type device 10, or when an access is made using a different account, thereby preventing a single recording medium 12 from being used by different users.

As described, according to the content management system 100 of the embodiment, the user is capable of running contents on the downloading type device 14, which is not capable of reading a recording medium, in return for the purchase in the past of contents in the form of a recording medium. A voucher is issued when the recording medium 12 is inserted into one of the recording medium type devices 10 and when the server 18 is accessed accordingly. Therefore, forgery of a digital signature using a personal computer or the like is prevented. Provision for acquisition of a voucher also prevents a single recording medium 12 from being used by different users.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

In the above description, it is assumed that the recording medium identifier and the device identifier 32 are encrypted by the encryption unit 26 using a key shared with the server 18. However, encryption is not essential. This is because the fact that the recording medium 12 is loaded in the recording medium type device 10 can be verified so long as a digital signature can be generated from the recording medium identifier and the device identifier 32. Absence of encryption is advantageous in that time consumed for encryption and efforts toward development or maintenance of an encryption program are saved.

Still alternatively, the recording medium identifier and the device identifier 32 may be encrypted by the encryption unit 26, using a key shared with the server 18, but the digital signature application unit 28 may generate a digital signature from the recording medium identifier and the device identifier 32 in a non-encrypted plain text format. This is advantageous in that encryption of the recording medium identifier and the device identifier 32 and generation of a digital signature can proceed in parallel.

In the above description, it is assumed that the database 20 stores by default recording medium identifiers of recording mediums that can be read by the recording medium type device 10 currently available on the market. Alternatively, each time the signature verification unit 40 of the server 18 verifies the authenticity of a digital signature, a recording medium identifier assigned the digital signature may be registered. This is advantageous in that it is not necessary to store recording medium identifiers of recording mediums and the storage space in the database 20 is saved.

In the above description, it is assumed that the server 18 stores an algorithm for generating a signature encryption key 36. Alternatively, the server 18 may maintain a table mapping the signature encryption key 36 into the device identifier and acquire data from the table in a static manner. In this case, it is not necessary for the server 18 to dynamically generate a signature encryption key 36 using an algorithm for generation and so the server 18 need not maintain an algorithm for generation. This is advantageous in that the risk of the algorithm for generation being leaked outside the server 18 is reduced.

What is claimed is:

1. A content management server comprising:
   a receiver configured to receive, from a first device adapted to read content from a recording medium and run the content, a first device identifier identifying the first device and a recording medium identifier identifying the recording medium loaded in the first device, along with a digital signature generated in the first device using an encryption key secretly stored in the first device;
   a signature verification unit configured to verify that the recording medium is loaded in the first device by verifying the authenticity of the digital signature;
   a storage unit configured to store a table that maps the first device identifier to a second device identifier identifying a second device adapted to acquire content by downloading the content and to run the content accordingly; and
   a voucher issuance unit configured to issue a voucher related to the content of the recording medium to a user account of the first device and the second device, when it is confirmed that: (i) the recording medium is loaded in the first device, and (ii) the second device is to the first device by referring to the table.

2. The content management server according to claim 1, wherein the voucher permits the second device to download a unit of content from the server.

3. The content management server according to claim 2, wherein the content which the voucher permits the second device to download is different from the content recorded in the recording medium.

4. A first device, comprising:
   a recording medium reader configured to read content from a recording medium and a processor configured to run the content;
   a recording medium identifier acquisition unit configured to acquire, from the recording medium, a recording medium identifier identifying the recording medium;
   a storage unit configured to store a first device identifier identifying the first device and an encryption key for encrypting a signature;
   a digital signature application unit configured to generate a digital signature for the recording medium identifier and the first device identifier based on the encryption key, and apply the digital signature to the recording medium identifier and the first device identifier; and
   a transmitter configured to transmit the recording medium identifier and the first device identifier with the digital signature to a server,
   wherein the server is operable to: (i) verify that the recording medium is loaded in the first device by verifying the authenticity of the digital signature, (ii) refer to a table that maps the first device identifier to a second device identifier identifying a second device for acquiring content by downloading the content, and (iii) issue a voucher related to the content of the recording medium to a user account of the first device and the second device, when it is confirmed that the recording medium is loaded in the first device, and the second device is mapped to the first device within the table.

5. A second device, comprising:
   a receiver configured to obtain content by downloading same from a network and a processor configured to run the content;
   a receiver configured to receive a voucher from a server that allows downloading of content to the second device from the server, the content being related to content stored on a recording medium that is loaded into a first device such that the first device obtains and runs the content by reading the content from the recording medium;
   a presentation unit configured to present the voucher to the server from which to download the content; and
   a content acquisition unit configured to acquire the content by downloading the content from the server,
   wherein the server is operable to: (i) verify that the recording medium is loaded in the first device by verifying an authenticity of a digital signature, whereby the digital signature is received by the server from the first device, which generates the digital signature based on a first device identifier identifying the first device, a recording medium identifier identifying the recording medium, and an encryption key, (ii) refer to a table that maps the first device identifier to a second device identifier identifying the second device, and (iii) issue a voucher related to the content of the recording medium to a user account of the first device and the second device, when it is confirmed that the recording medium is loaded in the first device, and the second device is mapped to the first device within the table.

6. The second device according to claim 5, wherein the voucher permits the second device to download a unit of content from the server.

7. The content management server according to claim 6, wherein the content which the voucher permits the second device to download is different from the content recorded in the recording medium.

8. A content management system comprising:
a first device, including:
   a recording medium reader configured to read content from a recording medium and a processor configured to run the content;
   a recording medium identifier acquisition unit configured to acquire, from the recording medium, a recording medium identifier identifying the recording medium;
   a storage unit configured to store a first device identifier identifying the first device and an encryption key for encrypting a signature;
   a digital signature application unit configured to generate a digital signature for the recording medium identifier and the first device identifier based on the encryption key, and apply the digital signature to the recording medium identifier and the first device identifier; and
   a transmitter configured to transmit the recording medium identifier and the first device identifier with the digital signature to a content management server;
a second device, including:
   a storage unit configured to store a second device identifier identifying the second device; and
   a receiver configured to obtain content by downloading same from a network and a processor configured to run the content, wherein the second device receives a voucher from the content management server that allows downloading of content, related to the content stored on the recording medium of the first device, to the second device from the content management server;
wherein the content management server includes:
a receiver configured to receive the first device identifier, the recording medium identifier, and the digital signature from the first device;
a signature verification unit configured to verify that the recording medium is loaded in the first device by verifying the authenticity of the digital signature;
a storage unit configured to store a table that maps the first device identifier to the second device identifier; and
a voucher issuance unit configured to issue the voucher to a user account of the first device and the second device, when it is confirmed that: (i) the recording medium is loaded in the first device, and (ii) the second device is mapped to the first device by referring to the table.

9. A content management method comprising:
receiving, from a first device adapted to read content from a recording medium and run the content, a first device identifier identifying the first device and a recording medium identifier identifying the recording medium loaded in the first device, along with a digital signature generated in the first device using an encryption key secretly stored in the first device;
verifying that the recording medium is loaded in the first device by verifying the authenticity of the digital signature;
reading a table that maps the first device identifier to a second device identifier identifying a second device adapted to acquire content by downloading the content and to run the content accordingly, the table being stored in a memory; and
issuing a voucher related to the content of the recording medium to a user account of the first device and the second device, when it is confirmed that: (i) the recording medium is loaded in the first device, and (ii) the second device is mapped to the first device by referring to the table.

10. A program embedded on a non-transitory, computer readable medium, comprising:
a module configured to receive, from a first device adapted to read content from a recording medium and run the content, a first device identifier identifying the first device and a recording medium identifier identifying the recording medium loaded in the first device, along with a digital signature generated in the first device using an encryption key secretly stored in the first device;
a module configured to verify that the recording medium is loaded in the first device by verifying the authenticity of the digital signature;
a module configured to read a table that maps the first device identifier to a second device identifier identifying a second device adapted to acquire content by downloading the content and to run the content accordingly, and to store the table in a memory; and
a module configured to issue a voucher related to the content of the recording medium to a user account of the first device and the second device, when it is confirmed that: (i) the recording medium is loaded in the first device, and (ii) the second device is mapped to the first device by referring to the table.

* * * * *

UNITED STATES PATENT AND TRADEMARK OFFICE
CERTIFICATE OF CORRECTION

PATENT NO. : 8,433,911 B2  
APPLICATION NO. : 12/819398  
DATED : April 30, 2013  
INVENTOR(S) : Kazuhiro Kanee and Muneki Shimada Page 1 of 1

It is certified that error appears in the above-identified patent and that said Letters Patent is hereby corrected as shown below:

In the Claims:

Change claim 1, col. 10, lines 2-3:
from "(ii) the second device is to the first device by referring to the table"
to --(ii) the second device is mapped to the first device by referring to the table--.

Signed and Sealed this
Sixteenth Day of July, 2013

Teresa Stanek Rea
*Acting Director of the United States Patent and Trademark Office*